United States Patent
Kanai et al.

(10) Patent No.: US 7,180,632 B2
(45) Date of Patent: Feb. 20, 2007

(54) IMAGE PROCESSING DEVICE, IMAGE PROCESSING METHOD, AND RECORD MEDIUM

(75) Inventors: Masashi Kanai, Matsumoto (JP); Kenji Fukasawa, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 1000 days.

(21) Appl. No.: 10/180,962

(22) Filed: Jun. 27, 2002

(65) Prior Publication Data

US 2003/0053088 A1    Mar. 20, 2003

(30) Foreign Application Priority Data

Jun. 28, 2001    (JP)    ............................. 2001-196841

(51) Int. Cl.
  *G06K 15/00*    (2006.01)
(52) U.S. Cl. .................. 358/1.9; 358/2.1; 358/520; 358/530
(58) Field of Classification Search ............... 358/1.9, 358/2.1, 530, 520, 509; 382/274
  See application file for complete search history.

(56) References Cited

U.S. PATENT DOCUMENTS

| | | | | |
|---|---|---|---|---|
| 5,502,580 | A * | 3/1996 | Yoda et al. | 358/518 |
| 5,530,540 | A * | 6/1996 | Wyatt et al. | 356/246 |
| 6,729,954 | B2 * | 5/2004 | Atsumi et al. | 463/7 |
| 2002/0097907 | A1 * | 7/2002 | Fukasawa | 382/167 |
| 2003/0012434 | A1 * | 1/2003 | Kanai | 382/167 |
| 2003/0030718 | A1 * | 2/2003 | Maeda | 347/250 |
| 2003/0035157 | A1 * | 2/2003 | Kanai | 358/518 |
| 2003/0053088 | A1 * | 3/2003 | Kanai et al. | 358/1.9 |
| 2003/0193677 | A1 * | 10/2003 | Zeng | 358/1.9 |

FOREIGN PATENT DOCUMENTS

| | | |
|---|---|---|
| JP | 9-214787 | 8/1997 |
| JP | 9-266538 | 10/1997 |
| JP | 10-215385 | 8/1998 |
| JP | 10-322561 | 12/1998 |
| JP | 2000-32282 | 1/2000 |
| JP | 2001-143065 | 5/2001 |
| JP | 2002-262304 | 9/2002 |
| JP | 02003018415 | * 1/2003 |
| JP | 02003018416 | * 1/2006 |

OTHER PUBLICATIONS

Japanese Patent Abstract, Publication No. 05-145956, Published Jun. 11, 1993.
Japanese Patent Abstract, Publication No. 09-037091, Published Feb. 7, 1997.
Japanese Patent Abstract, Publication No. 09-102882, Published Apr. 15, 1997.
Japanese Patent Abstract, Publication No. 09-186896, Published Jul. 15, 1997.
Japanese Patent Abstract, Publication No. 09-312854, Published Dec. 2, 1997.

* cited by examiner

*Primary Examiner*—Jerome Grant
(74) *Attorney, Agent, or Firm*—Lowe Hauptman & Berner, LLP

(57) ABSTRACT

In an image processing apparatus, a desired image processing is applied to an input signal by using a color correction table which changes an amount of conversion for a white point according to the luminance of white provided from an image output apparatus. It is possible to avoid influence of adaptation of the eye by making chromaticity of a target white point (D=0, (xwt, ywt)) close to chromaticity of white of the image output apparatus (D=1, (xwd, ywd)). Further, the target white point after the conversion is made close to a white point of the image output apparatus as luminance of the white provided from the image output apparatus increases. The reason for this constitution is that the human eye tends to adapt to bright light more than to dark light.

19 Claims, 9 Drawing Sheets

IMAGE PROCESSING DEVICE, IMAGE PROCESSING METHOD, AND RECORD MEDIUM

BACKGROUND OF THE INVENTION

1. Field of the Invention

The present invention relates to image processing applied to an image input signal when a color space of the image input signal is converted to a color space of an image output apparatus.

2. Description of the Prior Art

Devices such as a scanner, a monitor, a printer, and a projector individually have different color reproduction gamut. Thus, it is a problem how to reproduce a color while absorbing the difference in the color reproduction gamut.

For example, when color characteristics of a liquid crystal projector are matched to a color standard such as sRGB, it is first necessary to consider how to reproduce target color characteristics (a color matching method) within color gamut of the liquid crystal projector by comparing color gamuts of both of them. However, since the color standard such as sRGB is generally created based on color characteristics of a CRT display, when the color gamut of the projector, which has greenish color characteristics, and the color gamut of the sRGB are compared, there is difference in hue of gray (the direction of the gray axis) from white to black. There is a color matching method for reproducing target color characteristics with fidelity in a color gamut of a liquid crystal projector (color matching with priority to color reproduction) by a color correction for precisely matching color characteristics of the liquid crystal projector to the target color characteristics.

SUMMARY OF THE INVENTION

However, when the color characteristics of the projector are matched to the target color characteristics such as sRGB, there is such a problem that a resultant image often appears reddish, which is a result of excessive-color correction. This is because the sense of the eye adapts such that the original greenish white of the projector appears as natural white when the image before the color correction is viewed.

The present invention is devised to solve the problem described above, and has a purpose of providing an image processing apparatus, an image processing method, a program, and a storage medium which reproduce natural colors.

According to an aspect of the present invention, an image processing apparatus includes: a color correction table for changing an amount of conversion for a white point in accordance with luminance of white provided from an image output apparatus, and a color correction unit for applying color correction to an input signal intended for said image output apparatus by using the color correction table to obtain a color-corrected signal, and then supplying the color-corrected signal to the image output apparatus.

In this way, making chromaticity of a target white point close to chromaticity of white of image output apparatus avoids an influence of the adaptation of the eye.

In a further aspect of the present invention, a target white point after the conversion is made close to a white point of the image output apparatus as the luminance of the white provided from the image output apparatus increases.

This is because the human eye tends to adapt to bright light more than to dark light.

According to a further aspect of the present invention, an image processing apparatus includes: a first color correction table with priority to color reproduction, a second color correction table with priority to brightness, and a color correction unit for applying color correction to an input signal intended for an image output apparatus by using one of the color correction tables to obtain a color-corrected signal, and then supplying the color-corrected signal to said image output apparatus, wherein a target white point after the color correction by said first color correction table is made close to a white point of the image output apparatus.

In a further aspect of the present invention, said color correction unit selects one of said color correction tables for color correction of said input signal in accordance with the input signal.

In a further aspect of the present invention, an image processing method, comprises applying color correction to an input signal intended for an image output apparatus to obtain a color-corrected signal, by using a color correction table for changing an amount of conversion for a white point in accordance with luminance of white provided from the image output apparatus, and supplying the color-corrected signal to the image output apparatus.

In a further aspect of the present invention, an image processing method, comprises applying color correction to an input signal intended for said image output apparatus to obtain a color-corrected signal, by using one of a first color correction table with priority to color reproduction, and a second color correction table with priority to brightness, and supplying the color-corrected signal to the image output apparatus, wherein a target white point after the color correction by said first color correction table is made close to a white point of the image output apparatus.

In a further aspect of the present invention, a computer-readable medium stores a computer-program of instructions for execution by the computer to apply color correction to an input signal by using a color correction table for changing an amount of conversion for a white point in accordance with luminance of white provided from an image output apparatus.

In a further aspect of the present invention, a computer-readable medium stores a computer-program of instructions which, when executed by a computer, cause the computer to apply color correction to an input signal intended for an image output apparatus by using a first color correction table with priority to color reproduction and a second color correction table with priority to brightness.

In a further aspect of the present invention, a computer-readable medium stores a color correction table for changing an amount of conversion for a white point in accordance with luminance of white provided from an image output apparatus.

DETAILED DESCRIPTION OF THE PREFERRED EMBODIMENTS

The following section describes a preferred embodiment of the present invention while referring to drawings.

Figure 1:
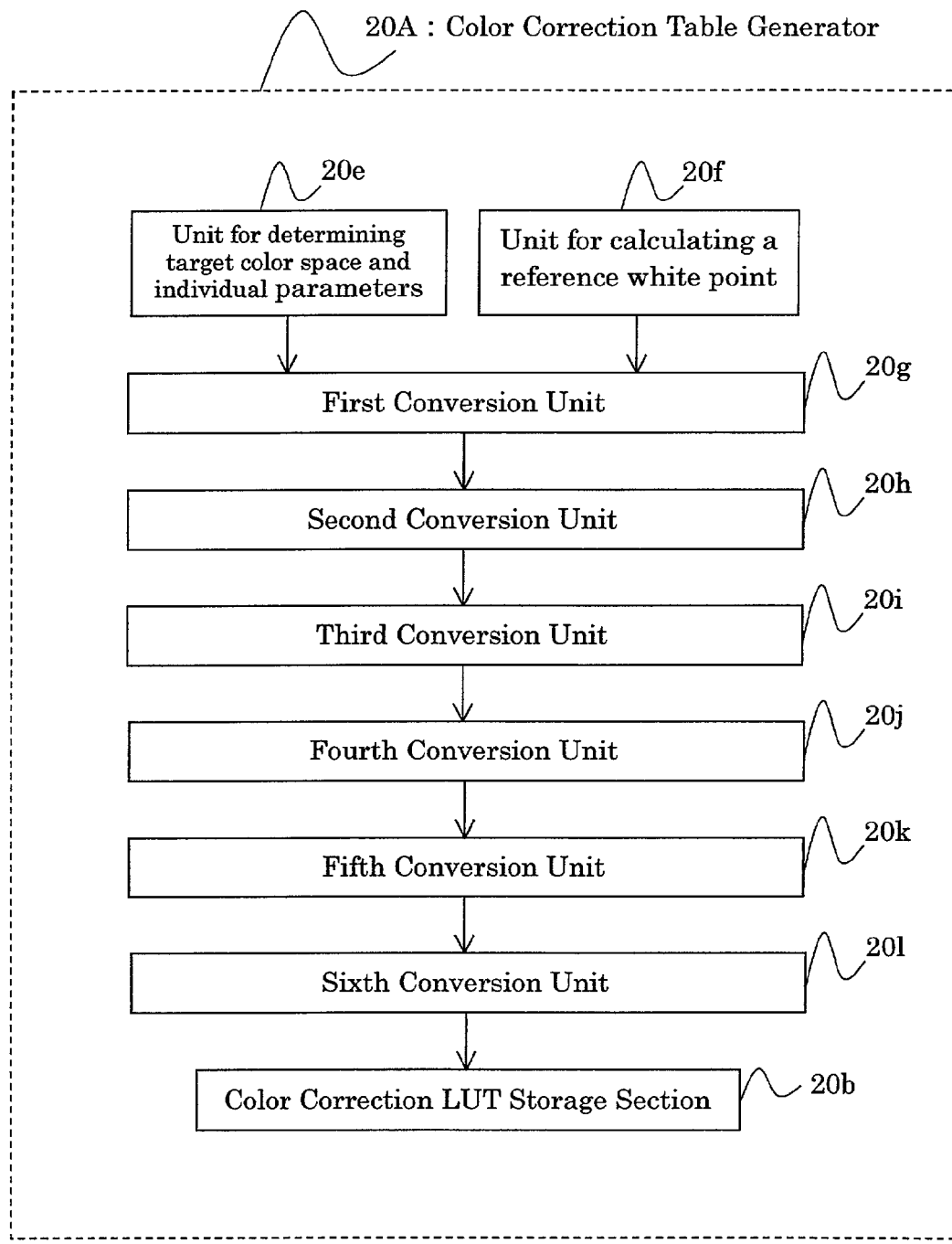
FIG. 1 is a function block diagram of a color correction table generator of a first embodiment of the present invention.
Figure 3:
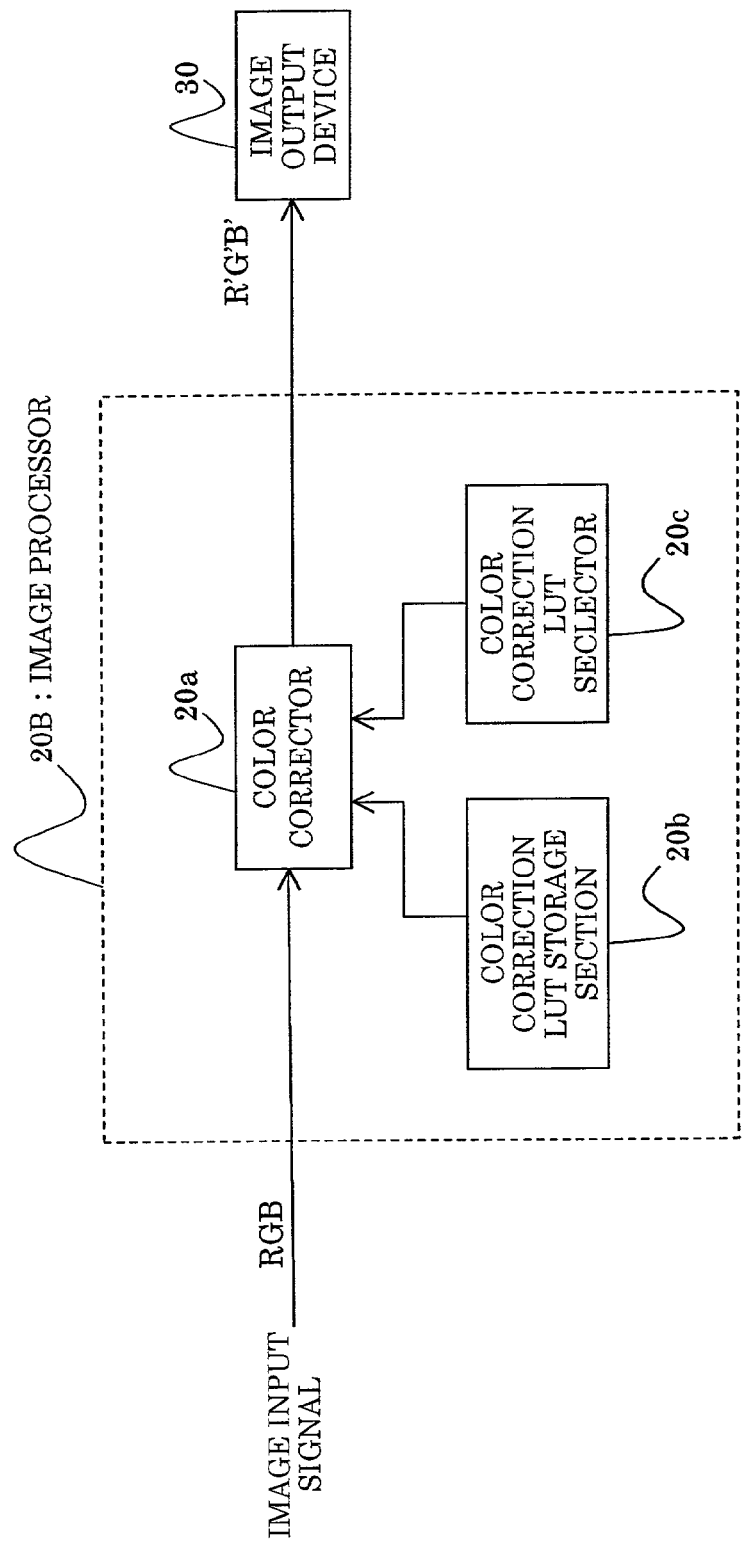
FIG. 3 is a function block diagram of the image processing apparatus of the first embodiment of the present invention.
Figure 7:
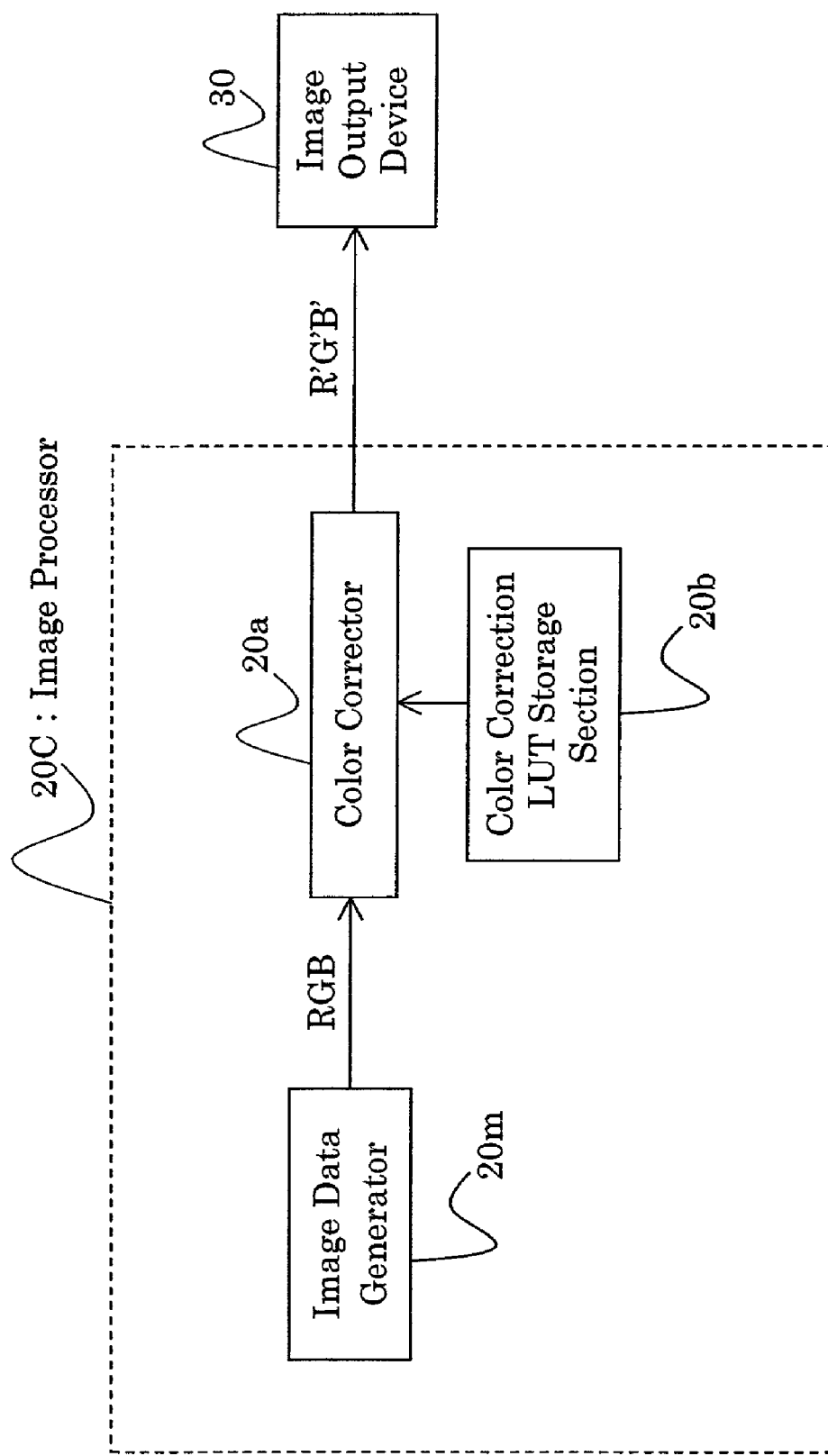
FIG. 7 is a function block diagram for an image processing apparatus of a second embodiment of the present invention.

FIG. 1 is a function block diagram of a color correction table generator according to a first embodiment of the present invention, and FIGS. 3 and 7 are a function block diagram of an image processing apparatus according to the first embodiment of the present invention.

Hardware Construction

Figure 2:
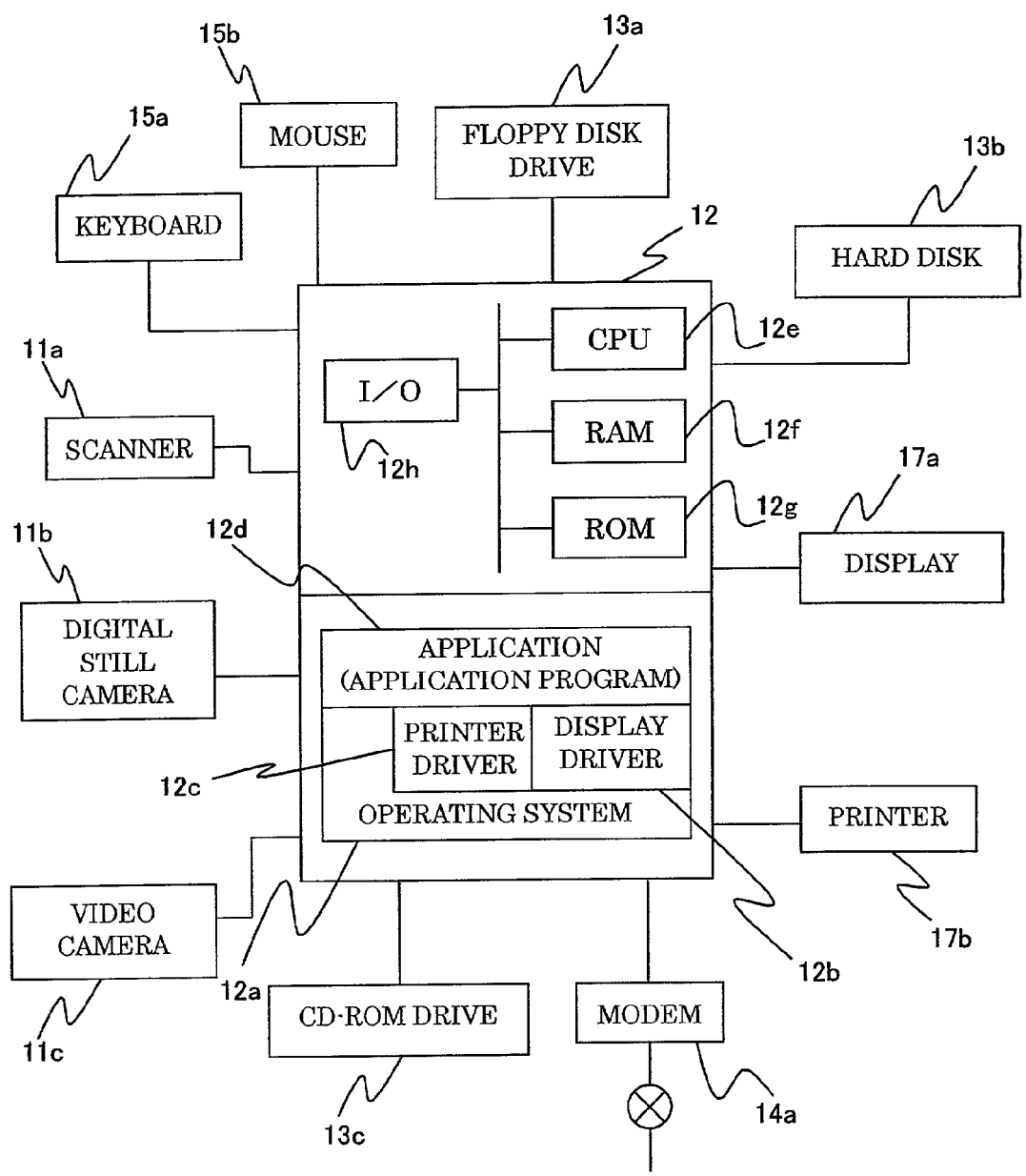
FIG. 2 is a schematic block diagram showing an example of a specific hardware constitution of the color correction table generator and an image processing apparatus of the present invention.

FIG. 2 shows an example of a concrete hardware construction about these the color correction table generating device and the image processing device by an outlined block diagram.

The present embodiment employs a computer system as an example of hardware for realizing the color-correction table generating device and the image processor. FIG. 3 shows the computer system as a block diagram. The computer system is provided with a scanner 11a, a digital still camera 11b, and a video camera 11c as image input devices, and they are connected with a computer main unit 12. The individual input devices generate an image data where an image is represented by pixels arranged as dot matrix, and provide the computer main unit 12 with the image data, where the image data represents about 16.7 million colors by 256-gradation display in three primary colors comprising R, G, and B.

A floppy disk drive 13a, a hard disk drive 13b, and a CD-ROM drive 13c are connected with the computer main unit 12 as external auxiliary storage apparatuses, the hard disk 13b stores base programs relating to the system, and necessary programs are read from a floppy disk and a CD-ROM if required. A modem 14a is connected for connecting the computer main unit 12 with an external network or the like as a communication device, and software and data are downloaded for introduction by connecting to the external network through a public communication line. In this example, though the modem 14a is used for the external access through the telephone line, a constitution for access to a network through a LAN adaptor is also possible. In addition, a keyboard 15a and a mouse 15b are connected for operating the computer main unit 12.

The computer main unit 12 is provided with a display 17a and a color printer 17b as image output devices. The display 17a is provided with a display area comprising 800 pixels in the horizontal direction and 600 pixels in the vertical direction, and 16.7 million colors are displayed on the individual pixels. This resolution is an example, and the resolution may be changed to 640×480 or 1024×768 as needed.

The color printer 17b is an ink jet printer, and prints an image on a print sheet as a medium with color ink of four colors comprising C, M, Y, and K. As its image resolution, high density print such as 360×360 dpi or 720×720 dpi is available, and as its gradation representation, two-gradation representation by selecting whether attaching the color ink or not is available. A predetermined program is running on the computer main unit 12 to obtain an image through the image input devices, and to display or to provide on the image output device. An operating system (OS) 12a operates as a base program, and a display driver (DSP DRV) 12b and a printer driver (PRT DRV) 12c are integrated into the operating system 12a. The drivers 12b and 12c depend on the models of display 17a and the color printer 17b, and are added to or changed in the operating system 12a according to the models. It is also possible to realize a feature in addition to a standard processing depending on the models. In other words, different additional processes are realized in a permissible range while a common processing system is maintained on a standard system as the operating system 12a.

As a prerequisite for running the program, the computer main unit 12 is provided with a CPU 12e, a RAM 12f, a ROM 12g, an I/O 12h and the like, and the CPU 12e executes the base program written in the ROM 12g as needed while using the RAM 12f as a temporary work area or specified memory area, or a program area, and controls the external apparatuses connected through the I/O 12h and internal apparatuses.

The application 12d is executed on the operating system 12a, which serves as the base program. Contents of the processing in application 12d vary, and include monitoring the operation of keyboard 15a and the mouse 15b as operating devices, properly controlling the different external apparatuses, executing corresponding calculation and the like when they are operated, and displaying or providing a processed result on the display 17a or the color printer 17b.

The computer system obtains image data through the scanner 11a as an image input device, performs a predetermined image processing with the application 12d, and show the processed result as output on the display 17a or the color printer 17b, which serve as image output devices.

Although in this embodiment the image processor is implemented as a computer system, such a computer system is not always required, but the system to which the image processor is applied may be any other system which requires the image processing of the present invention for the same image data. For example, there may be adopted a system wherein the image processor according to the present invention is built into a digital still camera and printing is performed by a color printer using image data after image processing. In a color printer which inputs and prints image data without going through a computer system, there may be adopted a construction wherein the image processing according to the present invention is performed for image data which are inputted through a scanner, a digital still camera, or a modem, followed by the execution of a printing process.

Of course, the present invention is also applicable to various other devices which handle image data, such as color facsimile devices, color copiers, and projectors.

Image Processing Control Program

The image processing control program according to the present invention is usually distributed in a stored state on a recording medium such as a floppy disk or a CD-ROM so that it can be read by the computer 12. The program is read by a media reader (e.g. CD-ROM driver 13c or floppy disk drive 13a) and is installed in the hard disk 13b. Then, a CPU reads a desired program from the hard disk 13b and executes a desired processing. The image processing control program itself according to the present invention also constitutes a part of the present invention.

Color Correction Table Generator

A color correction table generator 20A shown in FIG. 1 generates a color correction table for reproducing natural colors (a color correction table with priority to color reproduction).

In FIG. 1, the color correction table generator 20A is provided with a unit for determining target color space and individual parameters 20e, a unit for calculating reference white point 20f, a first conversion unit 20g, a second conversion unit 20h, a third conversion unit 20i, a fourth conversion unit 20j, a fifth conversion unit 20k, a sixth conversion unit 20l, and a color correction LUT storage section 20b. Detailed processing of these individual constitution units is described later.

Figure 5:
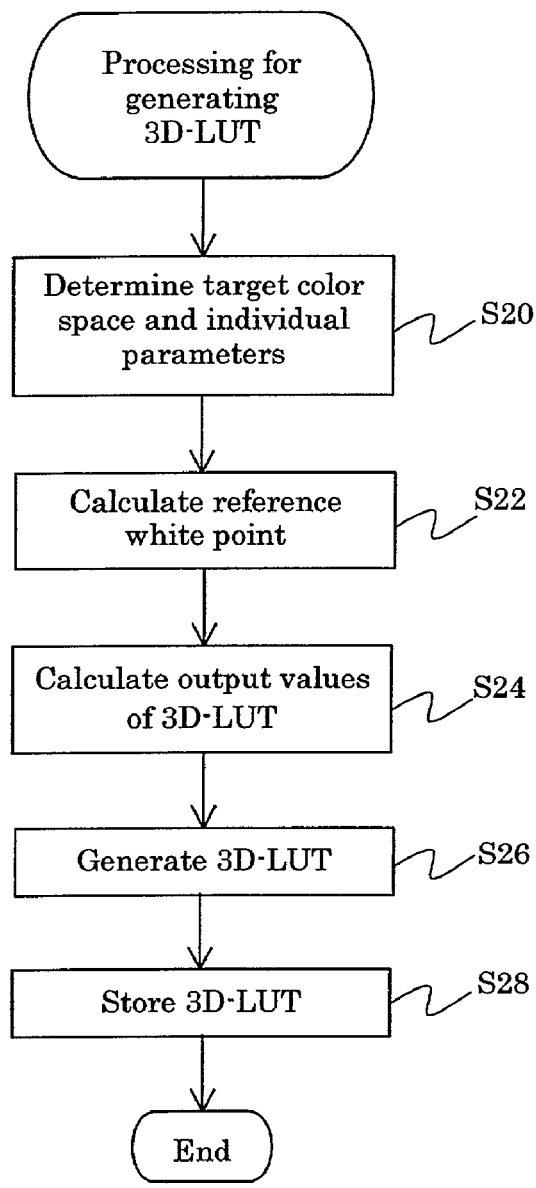
FIG. 5 is a flowchart describing a color correction table generation processing program executed by the first color correction table generator 20A.
Figure 6:
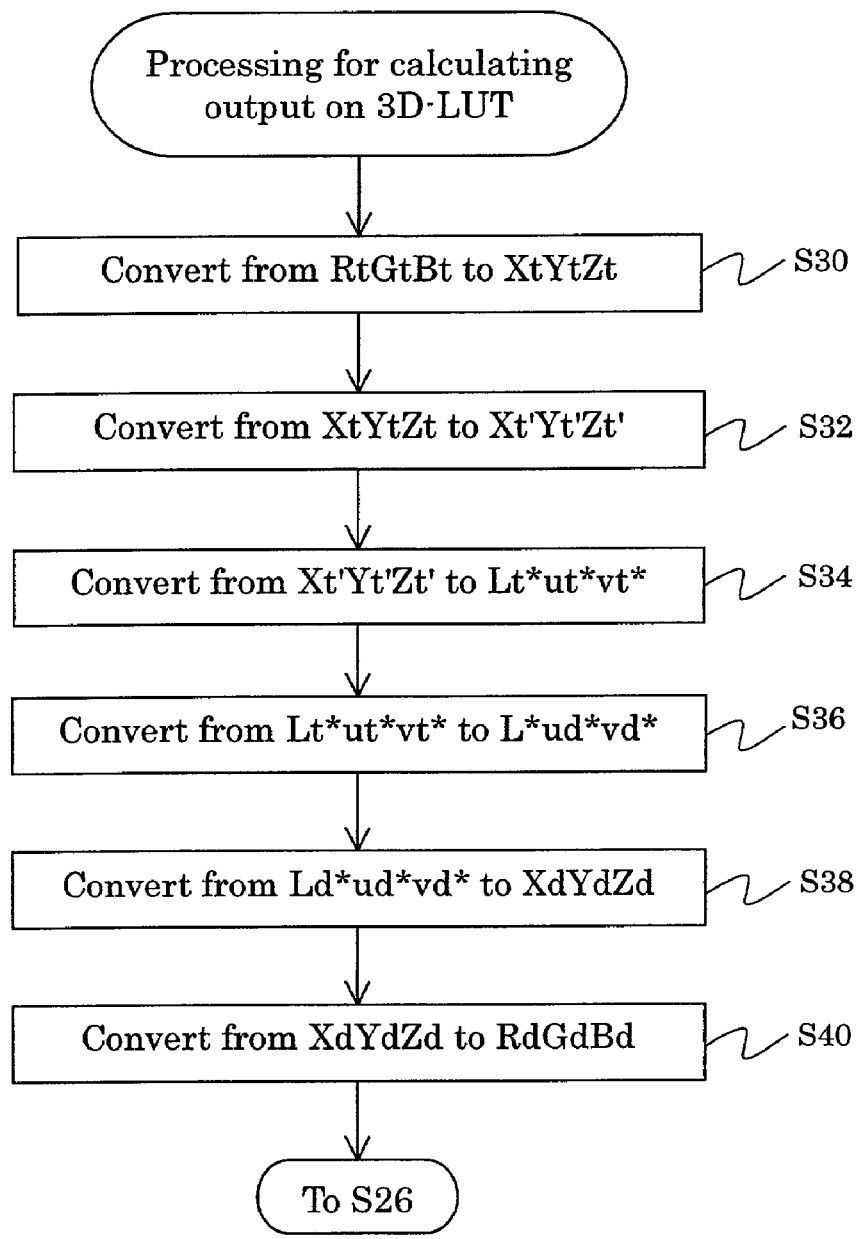
FIG. 6 is a flowchart describing an output value calculation processing program of a three-dimensional color correction table (3D-LUT)

The following section describes a color correction table generation processing program executed by the color correction table generator 20A shown in FIG. 1 while referring to FIG. 5 and FIG. 6. In the present embodiment, description is provided for a case where the image output apparatus is a projector.

It is necessary to measure color characteristics data of the projector described below in advance before executing the color correction table generation processing program.

Namely, the following individual color characteristics data should be measured in advance.

Tristimulus values Xwp, Ywp, Zwp for white (Rd, Gd, Bd)=(255, 255, 255)

Tristimulus values Xrp, Yrp, Zrp for red(Rd, Gd, Bd)=(255, 0, 0)

Tristimulus values Xgp, Ygp, Zgp for green (Rd, Gd, Bd)=(0, 255, 0)

Tristimulus values Xbp, Ybp, Zbp for blue (Rd, Gd, Bd)=(0, 0, 255)

Tristimulus values Xkp, Ykp, Zkp for black (Rd, Gd, Bd)=(0, 0, 0)

The individual measured data are standardized with respect to the luminance of white (Ywd) using the following expression (1), and an offset at black is subtracted.

[Equation 1]

$$\begin{aligned} X_{wd} &= (X_{wp} - X_{kp})/Y_{wp} \\ Y_{wd} &= (Y_{wp} - Y_{kp})/Y_{wp} \\ Z_{wd} &= (Z_{wp} - Z_{kp})/Y_{wp} \\ x_{wd} &= X_{wd}/(X_{wd} + Y_{wd} + Z_{wd}) \\ y_{wd} &= Y_{wd}/(X_{wd} + Y_{wd} + Z_{wd}) \end{aligned} \quad (1)$$

While the expression shows the data for white, the same conversion is conducted for R, G, and B. For black, (Xkd, Ykd, Zkd)=(0, 0, 0).

FIG. 5 is a flowchart describing a color correction table generation processing program executed by the first color correction table generator 20A.

Processing for determining a target color space and individual parameters (S20)

As shown in FIG. 5, the unit for determining target color space and individual parameters 20e in the color correction table generator 20A first determines the target color space and the individual parameters in a conversion matrix (S20).

First, chromaticity coordinates of individual colors, white (W), red (R), green (G), and Blue (B), in the target color space after the conversion are determined. Since the target color space is assumed as sRGB for the color correction table with priority to color reproduction, the individual chromaticity coordinates in the target color space are:

Chromaticity coordinates for white (R, G, B)=(255, 255, 255) are xwt=0.313, ywt=0.329, Chromaticity coordinates for red (R, G, B)=(255, 0, 0) are xwt=0.640, ywt=0.330, Chromaticity coordinates for green (R, G, B)=(0, 255, 0) are xwt=0.300, ywt=0.600, and Chromaticity coordinates for blue (R, G, B)=(0, 0, 255) are xwt=0.150, ywt=0.060.

As other parameters, a partial adaptation parameter D and a matching limit lightness Lmax are determined. The details for these parameters are described later.

Then, the unit for determining target color space and individual parameters 20e calculates a matrix Mt which converts RtGtBt to XtYtZt (S20). This conversion is also based on the definition of the target color space, and Mt is a matrix shown in the expression (2).

[Equation 2]

$$M_t = \begin{pmatrix} 0.4124 & 0.3576 & 0.1805 \\ 0.2126 & 0.7152 & 0.0722 \\ 0.0193 & 0.1192 & 0.9505 \end{pmatrix} \quad (2)$$

Then, the unit for determining target color space and individual parameters 20e calculates a matrix Md which converts RdGdBd to XdYdZd (S20). This conversion is based on the color characteristics of the projector, and Md is a matrix shown in the expression (3).

[Equation 3]

$$M_d = \begin{pmatrix} x_{rd} & x_{gd} & x_{bd} \\ y_{rd} & y_{gd} & y_{bd} \\ z_{rd} & z_{gd} & z_{bd} \end{pmatrix} \begin{pmatrix} S_{rd} & 0 & 0 \\ 0 & S_{gd} & 0 \\ 0 & 0 & S_{bd} \end{pmatrix} \quad (3)$$

where:
zrd=1-xrd-yrd
zgd=1-xgd-ygd
zbd=1-xbd-ybd

Srd, Sgd, and Sbd are values determined such that (Rd, Gd, Bd)=(255, 255, 255) is converted to (Xd, Yd, Zd)=(Xwd, Ywd, Zwd), and are obtained by the following expression:

[Equation 4]

$$\begin{pmatrix} S_{rd} \\ S_{gd} \\ S_{bd} \end{pmatrix} = \begin{pmatrix} x_{rd} & x_{gd} & x_{bd} \\ y_{rd} & y_{gd} & y_{bd} \\ z_{rd} & z_{gd} & z_{bd} \end{pmatrix}^{-1} \begin{pmatrix} x_{wd} \\ y_{wd} \\ z_{wd} \end{pmatrix} \quad (4)$$

Then, the unit for determining target color space and individual parameters 20e calculates a matrix Mwp used for a conversion from XtYtZt to Xt'Yt'Zt' (S20). There is such a problem that a resultant image often appears reddish, which is a result of excessive-color correction when color characteristics of the projector are completely matched to the target color characteristics such as sRGB. This is because the sense of the eye adapts such that the original greenish white of the projector appears natural white when the image before the color correction is being viewed. To avoid the influence of this adaptation, XtYtZt is converted to Xt'Yt'Zt' so as to make the chromaticity of the target white point close to the chromaticity of white of the projector. This conversion is conducted as follows based on theory of adaptation.

The tristimulus values XtYtZt are converted to response values L, M, and S of three types of the cones of the human eye (cells sensing color on the retina).

[Equation 5]
$$\begin{pmatrix} L \\ M \\ S \end{pmatrix} = \begin{pmatrix} 0.0708 & 0.9447 & -0.0155 \\ -0.4612 & 1.3618 & 0.1013 \\ 0.0000 & 0.0000 & 1.0000 \end{pmatrix} \begin{pmatrix} X_t \\ Y_t \\ Z_t \end{pmatrix} \quad (5)$$

Then, the unit for determining target color space and individual parameters 20e uses the following expressions to calculate response values L', M', and S' of the cones after adaptation.

$$L'=\{(Lwd/Lwt)D+(1-D)\}L \quad (6)$$

$$M'=\{(Mwd/Mwt)D+(1-D)\}M \quad (7)$$

$$S'=\{(Swd/Swt)D+(1-D)\}S \quad (8)$$

Figure 9:
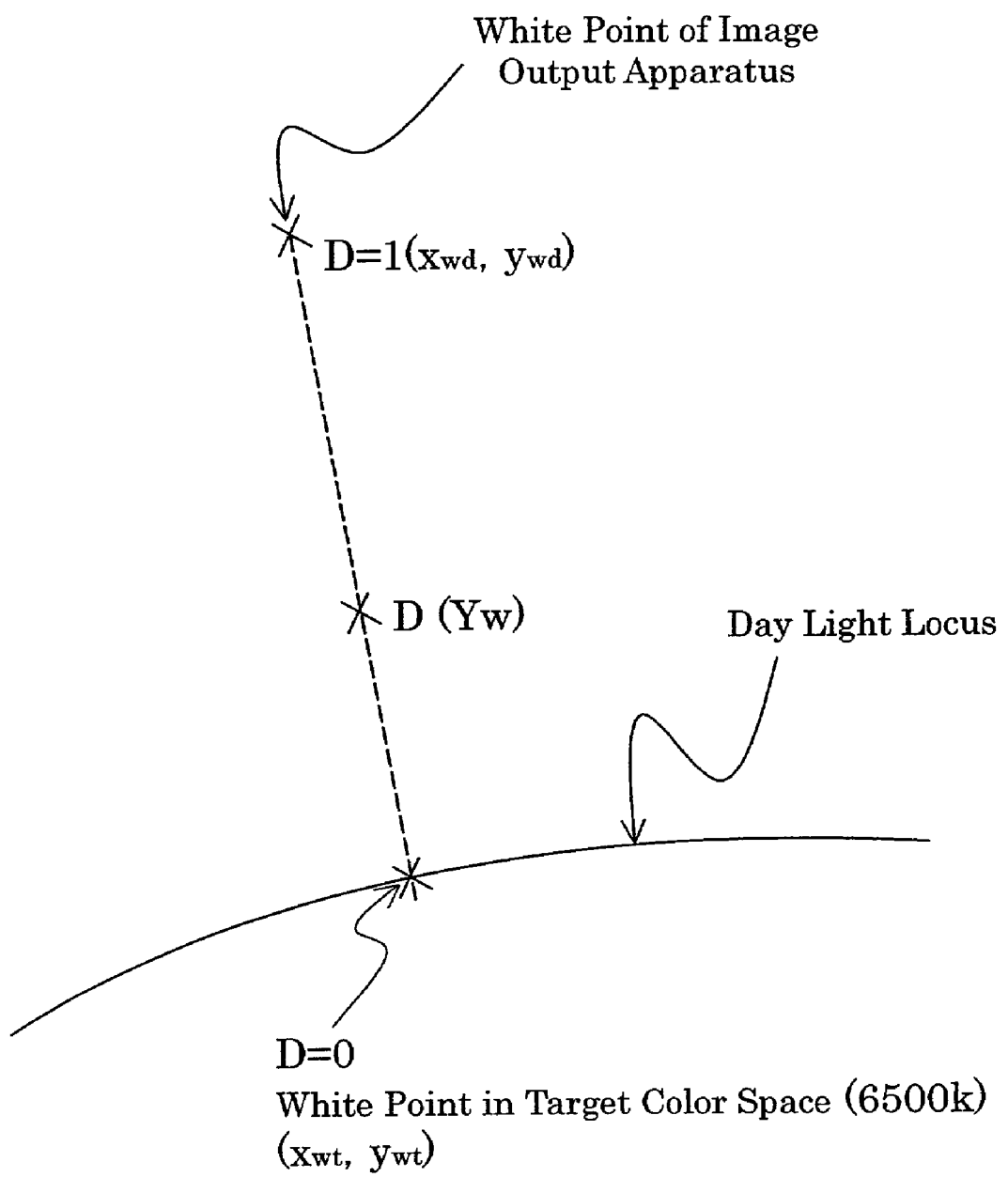
FIG. 9 is a drawing describing a target white point required for generating a color correction table with priority to color reproduction.

In these expressions, D is the partial adaptation parameter indicating a degree of the adaptation, and has a value in a range of $0 \leq D \leq 1$. As shown in FIG. 9, the color adaptation is not conducted, namely a white point (xwt, ywt) in the target color space is used as the target white point when D=0. On the other hand, a white point (xwd, ywd) of the projector is used as the target white point when D=1. The target white point is a point which internally divides a line connecting (xwt, ywt) and (xwd, ywd) with each other on the xy coordinate when 0<D<1. The parameter D is a function of luminance of the white of the projector serving as an image output apparatus, and D increases as the luminance of the white of the projector increases (namely D is made close to the white point of the projector). The reason why D increases as the luminance of the white of the projector increases is that the human eye tends to adapt to bright light more than to dark light. Daylight locus shown in FIG. 9 is a typical chromaticity locus of daylight specified by CIE (International Commission on Illumination). Chromaticity of standard light such as $D_{50}$ and $D_{65}$, which is the white point of sRGB, exists on this locus.

Lwt, Mwt, and Swt in the expression (6) to the expression (8) are response values of the cones for the white in the target color space, and are obtained by assigning the tristimulus values for the white in the target color space Xwt, Ywt, and Zwt to the expression (5). Similarly, Lwd, Mwd, and Swd in the expression (6) to the expression (8) are response values of the cones for the tristimulus values Xwd, Ywd, and Zwd of the white of the projector.

Finally, the response values of the cones L', M', and S' are converted back to the tristimulus values Xt'Yt'Zt' by using the following expression.

[Equation 6]
$$\begin{pmatrix} X_t' \\ Y_t' \\ Z_t' \end{pmatrix} = \begin{pmatrix} 2.5592 & -1.7754 & 0.2195 \\ 0.8667 & 0.1331 & 0.0000 \\ 0.0000 & 0.0000 & 1.0000 \end{pmatrix} \begin{pmatrix} L' \\ M' \\ S' \end{pmatrix} \quad (9)$$

A matrix in the expression (9) is an inverse matrix of the matrix in the expression (5). A matrix Mwp used for converting from XtYtZt to Xt'Yt'Zt' is obtained by using the following expression.

[Equation 7]
$$M_{wp} = \begin{pmatrix} 2.5592 & -1.7754 & 0.2195 \\ 0.8667 & 0.1331 & 0.0000 \\ 0.0000 & 0.0000 & 1.0000 \end{pmatrix} \times$$
$$\begin{pmatrix} (L_{wd}/L_{wt})D+(1-D) & 0 & 0 \\ 0 & (M_{wd}/M_{wt})D+(1-D) & 0 \\ 0 & 0 & (S_{wd}/S_{wt})D+(1-D) \end{pmatrix} \times$$
$$\begin{pmatrix} 0.0708 & 0.9447 & -0.0155 \\ -0.4612 & 1.3618 & 0.1013 \\ 0.0000 & 0.0000 & 1.0000 \end{pmatrix} \quad (10)$$

The matrix Mwp is a unit matrix when D=0.

Processing for calculating a reference white point (S22)

The unit for calculating reference white point 20f calculates a reference white point as follows (S22). In the color correction table with priority to color reproduction, a converted white is "the most bright white 6500K which the projector can provide". Specifically, a reference white point XnYnZn in a conversion from Ld*ud*vd* to XdYdZd in S38 described later is set to tristimulus values of white. The reference white point XnYnZn is also obtained in advance.

When the output of the projector is RnGnBn for the reference white point XnYnZn, the following relationship is established between XnYnZn and RnGnBn.

[Equation 8]

$$\begin{pmatrix} X_n \\ Y_n \\ Z_n \end{pmatrix} = p \begin{pmatrix} X_{wt} \\ Y_{wt} \\ Z_{wt} \end{pmatrix} = M_d \begin{pmatrix} (R_n/255)^{2.2} \\ (G_n/255)^{2.2} \\ (B_n/255)^{2.2} \end{pmatrix} + \begin{pmatrix} X_{kd} \\ Y_{kd} \\ Z_{kd} \end{pmatrix} \quad (11)$$

It is necessary to select a coefficient p in an expression (11) such that (Rn, Gn, Bn) is the brightest color in the color gamut of the projector, namely the maximum value of Rn, Gn, and Bn is 255. Since it is experimentally recognized that Rn=255 when white with a general color temperature (10000K or less) is provided for the current color characteristics of the projector, when Rn=255 is assigned to the expression (11), the coefficient p is represented as:

[Equation 9]

$$\begin{pmatrix} p \\ -(Gn/255)^{2.2} \\ -(Bn/255)^{2.2} \end{pmatrix} = \begin{pmatrix} X_{wt} & S_{gd}X_{gd} & S_{bd}X_{bd} \\ Y_{wt} & S_{gd}Y_{gd} & S_{bd}Y_{bd} \\ Z_{wt} & S_{gd}Z_{gd} & S_{bd}Z_{bd} \end{pmatrix}^{-1} \begin{pmatrix} S_{rd}x_{rd} + X_{kd} \\ S_{rd}y_{rd} + Y_{kd} \\ S_{rd}z_{rd} + Z_{kd} \end{pmatrix} \quad (12)$$

The coefficient p is obtained from the expression (12), and then the tristimulus values Xn, Yn, and Zn for the reference white point are obtained by assigning the obtained coefficient p to the expression (11).

Then, the tristimulus values Xn, Yn, and Zn for the reference white point are used to obtain coordinates (Lwd*, uwd*, vwd*) and (Lkd*, ukd*, vkd*) for the white and black of the projector in a uniform color space CIELUV based on the following expression.

[Equation 10]

$$\begin{aligned} L^* &= 116(Y_d/Y_n)^{1/3} - 16 \quad \text{if } Y_d/Y_n > 0.008856 \\ &= 903.3(Y_d/Y_n) \quad \text{if } Y_d/Y_n \leq 0.008856 \\ u^* &= 13L^*[4X_d/(X_d + 15Y_d + 3Z_d) - 4X_n/(X_n + 15Y_n + 3Z_n)] \\ v^* &= 13L^*[9Y_d/(X_d + 15Y_d + 3Z_d) - 9Y_n/(X_n + 15Y_n + 3Z_n)] \end{aligned} \quad (13)$$

When the tristimulus values for white of the projector Xwd, Ywd, and Zwd are assigned to the expression (13), Lwd*, uwd* and vwd* are obtained, and when the tristimulus values for black of the projector Xkd, Ykd, and Zkd are assigned to the expression (13), Lkd*, ukd* and vkd* are obtained.

Processing for calculating output values of the three-dimensional color correction table (S24).

Then, the first to sixth conversion units 20g to 20l in the color correction table generator 20A calculate output values RdGdBd corresponding to the individual input values RtGtBt for a three-dimensional color correction table (3D-LUT) (S24). The output value calculation processing on the three-dimensional color correction table (3D-LUT) is described in more detail while referring to FIG. 6. In FIG. 6, processing in S30 is conducted by the first conversion unit 20g, processing in S32 is conducted by the first conversion unit 20h, processing in S34 is conducted by the first conversion unit 20i, processing in S36 is conducted by the first conversion unit 20j, processing in S38 is conducted by the first conversion unit 20k, and processing in S40 is conducted by the first conversion unit 20l.

The first conversion unit 20g converts the input RtGtBt entered into the three-dimensional color correction table to the tristimulus values XtYtZt based on definition of the target color space (S30). Since sRGB is the target color space in the color correction table with priority to color reproduction, the calculation is conducted in accordance with the following expressions (14) and (15) based on the definition of sRGB.

[Equation 11]

$$\begin{aligned} &\text{if } R_t/255, G_t/255, B_t/255 \leq 0.04045 \\ &\quad r_t = R_t/255/12.92 \\ &\quad g_t = G_t/255/12.92 \\ &\quad b_t = B_t/255/12.92 \end{aligned} \quad (14)$$

$$\begin{aligned} &\text{if } R_t/255, G_t/255, B_t/255 \geq 0.04045 \\ &\quad r_t = [(R_t/255 + 0.055)/1.055]^{2.4} \\ &\quad g_t = [(G_t/255 + 0.055)/1.055]^{2.4} \\ &\quad b_t = [(B_t/255 + 0.055)/1.055]^{2.4} \end{aligned} \quad (15)$$

The final values for the XtYtZt are obtained by the following expression (16).

[Equation 12]

$$\begin{pmatrix} X_t \\ Y_t \\ Z_t \end{pmatrix} = M_t \begin{pmatrix} r_t \\ g_t \\ b_t \end{pmatrix} \quad (16)$$

Mt in the expression (16) is the matrix obtained by the expression (2).

Then, the second conversion unit 20h uses the expression (10) and the following expression (17) to convert XtYtZt to Xt'Yt'Zt' (S32).

[Equation 13]

$$\begin{pmatrix} X_t' \\ Y_t' \\ Z_t' \end{pmatrix} = M_{wp} \begin{pmatrix} X_t \\ X_t \\ X_t \end{pmatrix} \quad (17)$$

With this conversion, the influence from the adaptation of the sense of the eye is avoided. Namely, processing for making the chromaticity of the target white point close to the chromaticity of the white of the projector is conducted by converting from XtYtZt to Xt'Yt'Zt'.

Then, the third conversion unit 20i uses the following expression (18) to convert the tristimulus values Xt'Yt'Zt' in the target color space to a coordinate value Lt*ut*vt* in the color compression space CIE LUV for associating the color in the target color space and the color of the projector with each other by representing them in the CIE LUV space, which is a uniform color space (S34).

[Equation 14]

$$\begin{aligned} L_t^* &= 116(Y_t'/Y_{wt}')^{1/3} - 16 \quad \text{if } Y_t'/Y_{wt}' > 0.008856 \\ &= 903.3(Y_t'/Y_{wt}') \quad \text{if } Y_t'/Y_{wt}' \leq 0.008856 \\ u_t^* &= 13L*[4X_t'/(X_t' + 15Y_t' + 3Z_t') - 4X_{wt}'/(X_{wt}' + 15Y_{wt}' + 3Z_{wt}')] \\ v_t^* &= 13L*[9Y_t'/(X_t' + 15Y_t' + 3Z_t') - 9Y_{wt}'/(X_{wt}' + 15Y_{wt}' + 3Z_{wt}')] \end{aligned}$$ (18)

Xwt', Ywt', and Zwt' in the expression (18) are values of Xt', Yt', and Zt' at the white (Rt=Gt=Bt=255) in the target color space.

Then, the fourth conversion unit 20j obtains a color Ld*ud*vd* of the projector corresponding to the color Lt*ut*vt* in the target color space (S36).

Since the three-dimensional color correction table with priority to color reproduction has such a purpose that a color matches to the target color space, basically (Ld*, ud*, vd*)=(Lt*, ut*, vt*). However, since the luminance of the black of the projector is not zero, and (Xkd, Ykd, Zkd)=(0, 0, 0) in the target color space is out of the color gamut of the projector, when the calculation is conducted without considering these facts, the gradation is shrunk in a low gradation area. Thus, in the present embodiment, a corresponding color deviates from a color in the target color space as the lightness of the color in the target color space Lt* decreases, and the black in the target color space (Lt*=0) is converted to the measured black of the projector. The processing in S36 described above is represented by the following expressions.

[Equation 15]

$$\text{if } L_t^* > L_{max}^*$$ (19)
$$L_d^* = L_t^*$$
$$u_d^* = u_t^*$$
$$v_d^* = v_t^*$$

$$\text{if } L_t^* \leq L_{max}^*$$ (20)
$$L_d^* = L_t^* + (L_{kd}^* - L_{kt}^*)(L_{max}^* - L_t^*)/L_{max}^*$$
$$u_d^* = u_t^* + (u_{kd}^* - u_{kt}^*)(L_{max}^* - L_t^*)/L_{max}^*$$
$$v_d^* = v_t^* + (v_{kd}^* - v_{kt}^*)(L_{max}^* - L_t^*)/L_{max}^*$$

Here, Lkt*, ukt* and vkt* are results of the calculation by the expressions (14) to (18) for the black in the target color space (Rt, Gt, Bt)=(0, 0, 0), and Lkd*, ukd*, and vkd* represent a coordinate of the black of the projector in the CIE LUV space. Also, in the present embodiment, the matching limit lightness Lmax is 100.

Then, the fifth conversion unit 20k uses the following expression to convert Ld*ud*vd* to XdYdZd (S38).

[Equation 16]

$$\begin{aligned} Y_d &= [(L_d^* + 16)/116]^3 Y_n \quad \text{if } L_d^* > 8.000 \\ &= (L_d^*/903.3)Y_n \quad \text{if } L_d^* \leq 8.000 \\ u_d' &= u_d^*/13L_d^* + 4X_n/(X_n + 15Y_n + 3Z_n) \\ v_d' &= v_d^*/13L_d^* + 9Y_n/(X_n + 15Y_n + 3Z_n) \\ X_d &= (9u_d'/4v_d')Y_d \\ Z_d &= [(12 - 3u_d' - 20v_d')/4v_d']Y_d \end{aligned}$$ (21)

The values of Xn, Yn, and Zn are the tristimulus values of the reference white point.

Finally, the sixth conversion unit 20l converts XdYdZd to RdGdBd based on the color characteristics of the projector (S40). The conversion expressions are the following expressions (22) and (23).

[Equation 17]

$$\begin{pmatrix} r_d \\ g_d \\ b_d \end{pmatrix} = M_d^{-1} \begin{pmatrix} X_d - X_{kd} \\ Y_d - Y_{kd} \\ Z_d - Z_{kd} \end{pmatrix}$$ (22)

[Equation 18]

$$R_d = 255 r_d^{\frac{1}{2.2}}$$
$$G_d = 255 g_d^{\frac{1}{2.2}}$$
$$B_d = 255 b_d^{\frac{1}{2.2}}$$ (23)

In the expression (14), $M_d^{-1}$ is an inverse matrix of the matrix Md shown in the expression (3). As the result of the calculation, Rd, Gd, Bd are zero when Rd, Gd, Bd<0, and Rd, Gd, Bd are 255 when when Rd, Gd, Bd>255. The values of Rd, Gd, and Bd obtained here are final data of the three-dimensional color correction table.

Then, the procedure returns to S26 in FIG. 5, resultantly the three-dimensional color correction table is generated based on these final data for the three-dimensional color correction table (S26), and this generated three-dimensional color correction table is stored in the color correction LUT storage section 20b (S28).

As described above, since XtYtZt are converted to Xt'Yt'Zt' for avoiding the influence of the adaptation of the eye, and the processing for making the chromaticity of the target white point close to the chromaticity of the white of the projector, it is possible to generate the color correction table for reproducing natural colors.

Image Processing Device

First Embodiment

In FIG. 3, the image processing device 20B executes a desired image processing to RGB image input data and outputs the image-processed image data to the image output device 30. Here, the image data is that a color image is divided into predetermined color components and respective components have some proper strength, and the data has a chromatic color or an achromatic color such as gray and black, if it is mixed in predetermined ratio. The present embodiment will be explained in the case where the image output device 30 such as a projector, a display or the like reproduces a color based on RGB data.

The image processor 20B is provided with: a color correction LUT storage section 20b, which stores at least the color correction table with priority to color reproduction, which has been generated by the color correction table generator 20A; and a color corrector 20a which reads a color correction table (LUT) selected by a color correction LUT selector 20c from the color correction LUT storage section 20b and which transforms RGB data into R'G'B' data by reference to the thus-read color correction LUT.

Next, with referring to FIG. 4, the operation of the image processing device 20B is explained hereinafter.

Figure 4:
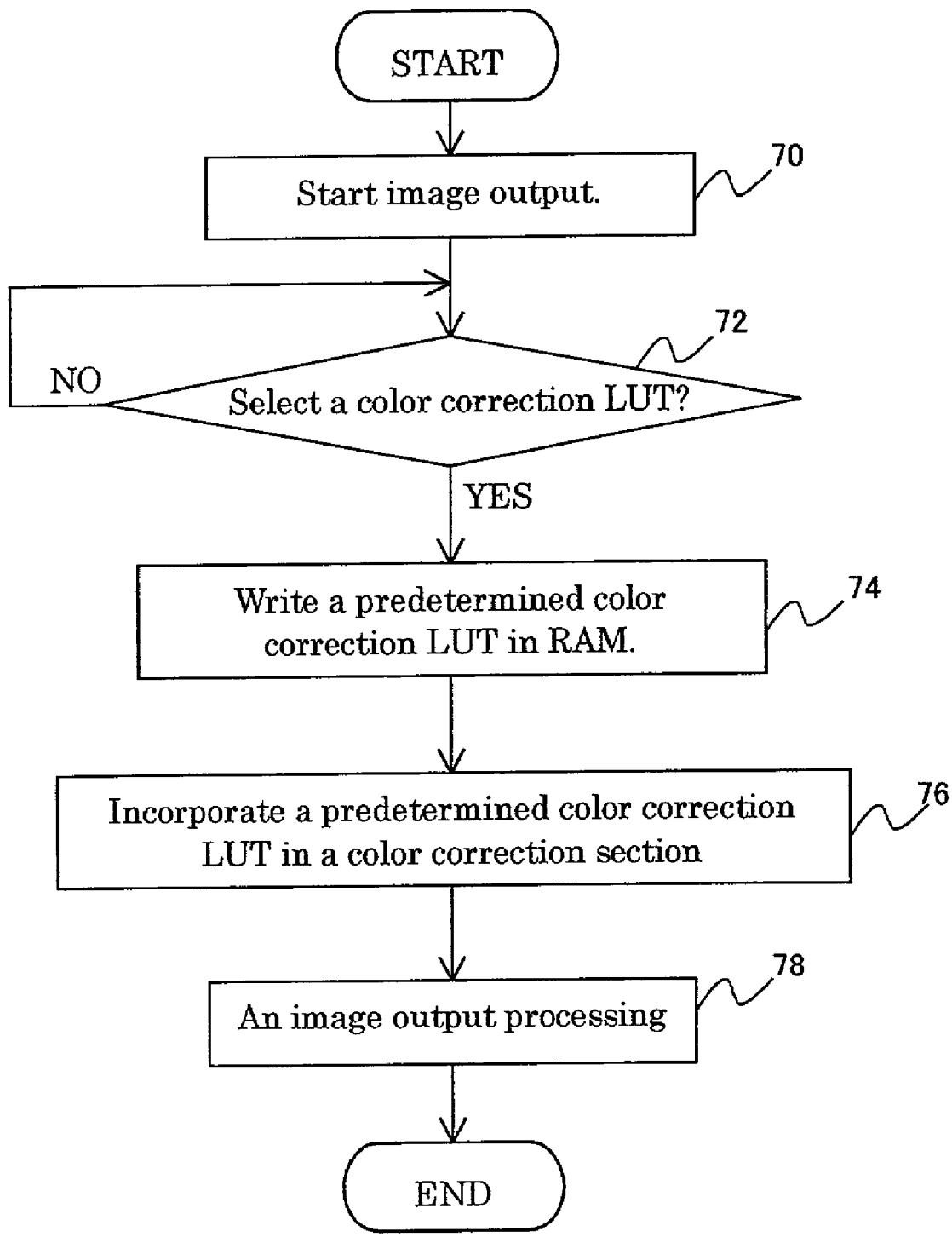
FIG. 4 is a flowchart describing the operation of the image processing apparatus 20B.

As shown in FIG. 4, if the start of an image output is instructed by a user (step 70) and if a three dimensional color correction LUT is selected (step 72, Yes), the selected three dimensional color correction LUT is read out from the color correction LUT storage section 20b and it is written into a RAM (step 74). The three dimensional color correction LUT is incorporated in the color correction section 20a (step 76), an image processing is executed by using an interpolation calculation with referring to the three dimensional color correction LUT, and an image output processing is executed (step 78).

Although this embodiment is constructed so that in step 72 a desired LUT can be selected using the color correction LUT selector 20i in accordance with a desired use of the user.

Since with the image processing apparatus according to the present embodiment, the image processing is conducted by using the color correction table with priority to color reproduction which conducts the processing for making the chromaticity of the target white point close to the chromaticity of the white of the projector for avoiding the influence of the adaptation of the eye, it is possible to reproduce natural colors.

Second Embodiment

In FIG. 7, the image processing device 20C executes a desired image processing to RGB image input data and outputs the image-processed image data to the image output device 30. As described in the case of first embodiment, the image data is that a color image is divided into predetermined color components and respective components have some proper strength, and the data has a chromatic color or an achromatic color such as gray and black, if it is mixed in predetermined ratio. The present second embodiment will be explained in the case where a projector reproduces a color based on RGB data.

The image processing apparatus 20C is provided with: a color correction LUT storage section 20b for storing at least a color correction table which prioritizes color reproduction, and is generated by the color correction table generator 20A, and a color correction table which prioritizes brightness, and is constituted so as to match colors without wasting the lightness range of the projector, and a color correction unit 20a which reads out a selected color correction table (LUT) from the color correction LUT storage section 20b, and converts the RGB data supplied from an image data generator 20m into the R'G'B' while referring to the read-out color correction LUT. The constitution is designed such that when the RGB data supplied from the image data generator 20m are data such as a natural image whose colors should be regenerated with fidelity, a predetermined data determination flag is on, and when the RGB data are data such as presentation data whose color should be regenerated while the brightness is prioritized, the predetermined data determination flag is off.

Figure 8:
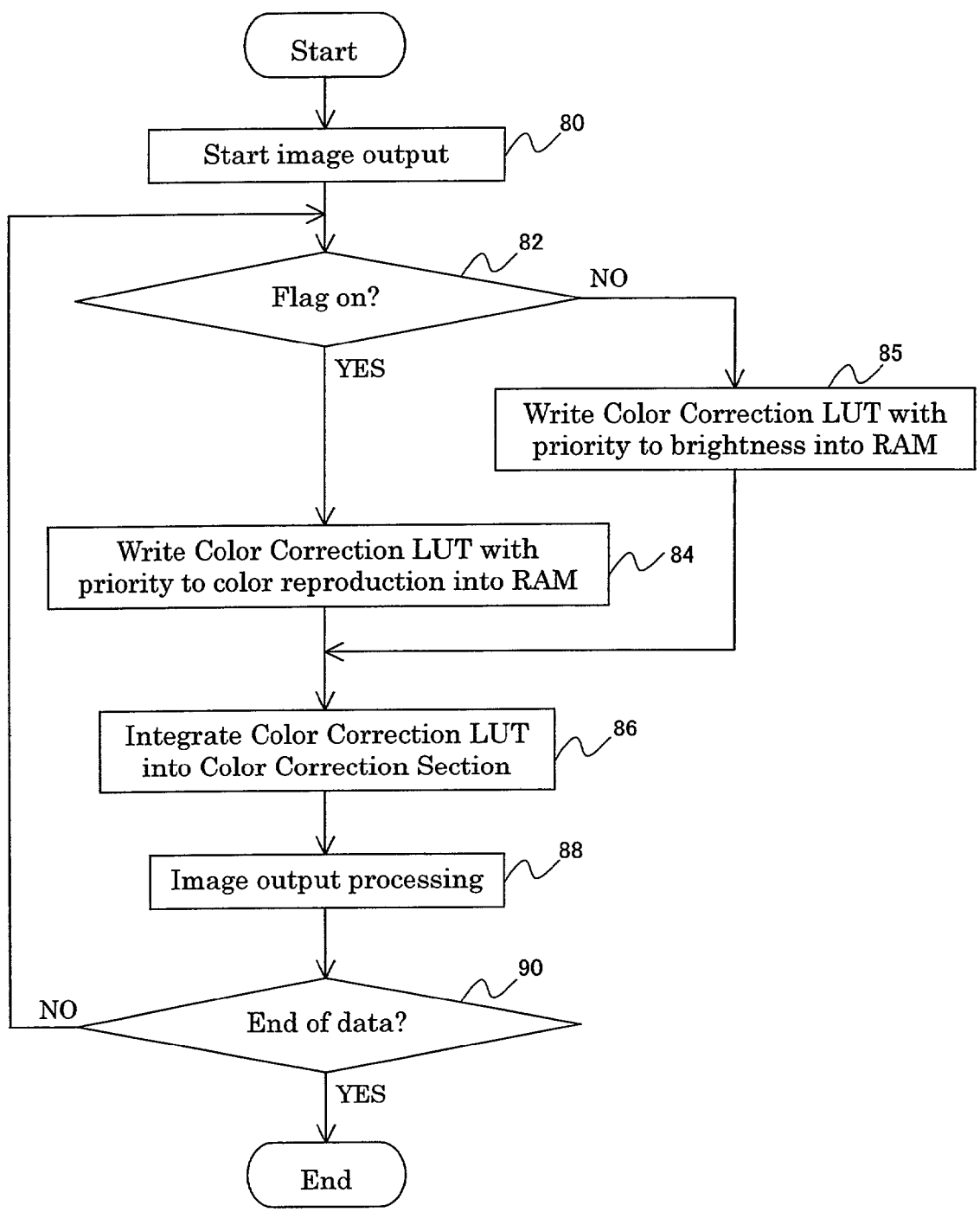
FIG. 8 is a flowchart describing the operation of the image processing apparatus 20C.

The following section describes the operation of the image processing apparatus 20C while referring to FIG. 8.

As shown in FIG. 4, when a user instructs to start image output (Step 80), the color correction unit 20a determines whether the predetermined data determination flag for the data supplied from the image data generator 20m is on (Step 82). When the predetermined data determination flag is on (Step 82, Yes), the three-dimensional color correction table with priority to color reproduction is read out from the color correction table storage section 20b, and is read into a RAM (Step 84), and when the predetermined data determination flag is off (Step 82, No), the three-dimensional color correction table with priority to brightness is read out from the color correction table storage section 20b, and is read into the RAM (Step 85). Then the read-out three-dimensional color correction LUT is integrated into the color correction unit 20a (Step 86), and the image processing is conducted by interpolation while referring to the three-dimensional color correction table, thereby conducting the image output processing (Step 88).

The steps 82 to 88 are repeated until the end of the data (Step 90).

In the present embodiment, since either the color correction table with priority to color reproduction or the color correction table with priority to brightness is selected based on whether the data determination flag is on or off in Step 82, colors are reproduced properly according to the type of the data.

With the image processing apparatus according to the present embodiment, when the color correction table with priority to color reproduction is selected, since the processing for making the chromaticity of the target white point close to the chromaticity of the white of the projector is conducted for avoiding the influence of the adaptation of the eye, it is possible to reproduce natural colors.

What is claimed is:

1. An image processing apparatus, comprising:
   a color correction table for changing an amount of conversion for a white point in accordance with luminance of white provided from an image output apparatus, and
   a color correction unit for applying color correction to an input signal intended for said image output apparatus by using the color correction table to obtain a color-corrected signal, and then supplying the color-corrected signal to the image output apparatus.

2. The image processing apparatus according to claim 1, wherein a target white point after the conversion is made close to a white point of the image output apparatus as the luminance of the white provided from the image output apparatus increases.

3. The image processing apparatus according to claim 1, wherein a target white point after the conversion is made closer to a white point of the image output apparatus as the luminance of the white provided from the image output apparatus increases.

4. An image processing apparatus, comprising:
   a first color correction table with priority to color reproduction,
   a second color correction table with priority to brightness, and
   a color correction unit for applying color correction to an input signal intended for an image output apparatus by using one of the color correction tables to obtain a color-corrected signal, and then supplying the color-corrected signal to said image output apparatus,
   wherein a target white point after the color correction by said first color correction table is made close to a white point of the image output apparatus.

5. The image processing apparatus according to claim 4, wherein said color correction unit selects one of said color correction tables for color correction of said input signal in accordance with the input signal.

6. The image processing apparatus according to claim 4, wherein a target white point after the color correction by said first color correction table is made closer to a white point of the image output apparatus as luminance of white provided from the image output apparatus increases.

7. An image processing method, comprising:
applying color correction to an input signal intended for an image output apparatus to obtain a color-corrected signal, by using a color correction table for changing an amount of conversion for a white point in accordance with luminance of white provided from the image output apparatus, and
supplying the color-corrected signal to the image output apparatus.

8. The image processing method according to claim 7, wherein a target white point after the conversion is made closer to a white point of the image output apparatus as the luminance of the white provided from the image output apparatus increases.

9. The image processing method according to claim 7, further comprising
generating the color correction table based on the luminance of white provided from the image output apparatus.

10. The image processing method according to claim 9, wherein
said generating comprises using an adaptation parameter which is increased as the luminance of white provided from the image output apparatus increases.

11. The image processing method according to claim 10, wherein said adaptation parameter is in a range between and inclusive of 0 and 1.

12. An image processing method, comprising:
applying color correction to an input signal intended for an image output apparatus to obtain a color-corrected signal, by using one of a first color correction table with priority to color reproduction, and a second color correction table with priority to brightness, and
supplying the color-corrected signal to the image output apparatus,
wherein a target white point after the color correction by said first color correction table is made close to a white point of the image output apparatus.

13. The image processing method according to claim 12, wherein a target white point after the color correction by said first color correction table is made closer to a white point of the image output apparatus as luminance of white provided from the image output apparatus increases.

14. A computer-readable medium storing a computer-program of instructions which, when executed by a computer, cause the computer to apply color correction to an input signal by using a color correction table for changing an amount of conversion for a white point in accordance with luminance of white provided from an image output apparatus.

15. The computer-readable medium according to claim 14, wherein a target white point after the conversion is made closer to a white point of the image output apparatus as the luminance of the white provided from the image output apparatus increases.

16. A computer-readable medium storing a computer-program of instructions which, when executed by a computer, cause the computer to apply color correction to an input signal intended for an image output apparatus by using a first color correction table with priority to color reproduction and a second color correction table with priority to brightness.

17. The computer-readable medium according to claim 16, wherein a target white point after the color correction by said first color correction table is made closer to a white point of the image output apparatus as luminance of white provided from the image output apparatus increases.

18. A computer-readable medium storing a color correction table for changing an amount of conversion for a white point in accordance with luminance of white provided from an image output apparatus.

19. The computer-readable medium according to claim 18, wherein a target white point after the conversion is made closer to a white point of the image output apparatus as the luminance of the white provided from the image output apparatus increases.

* * * * *